Aug. 6, 1929.                    J. BYKOWY                    1,723,919
                                 INSECT TRAP
                             Filed April 13, 1928
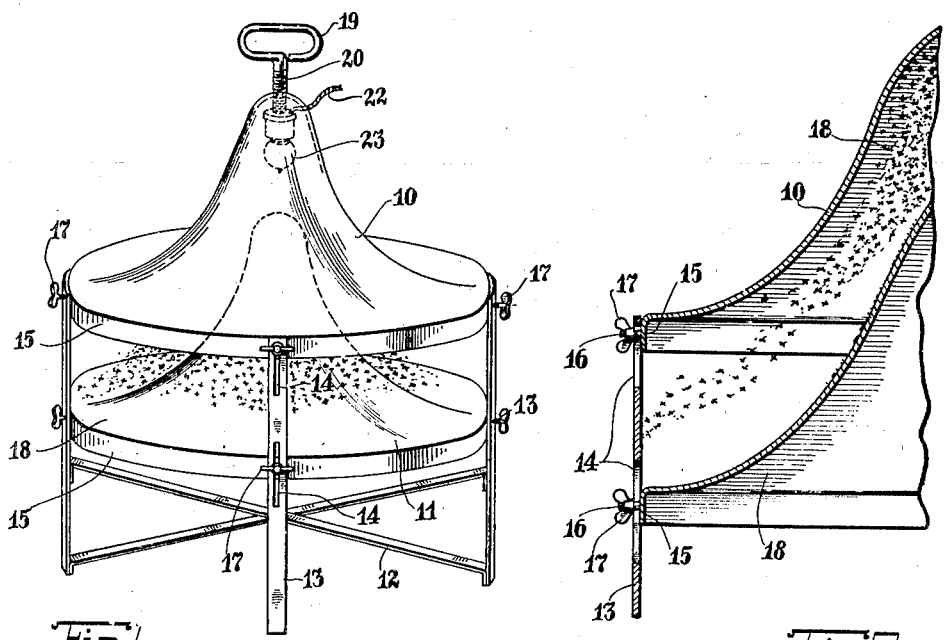
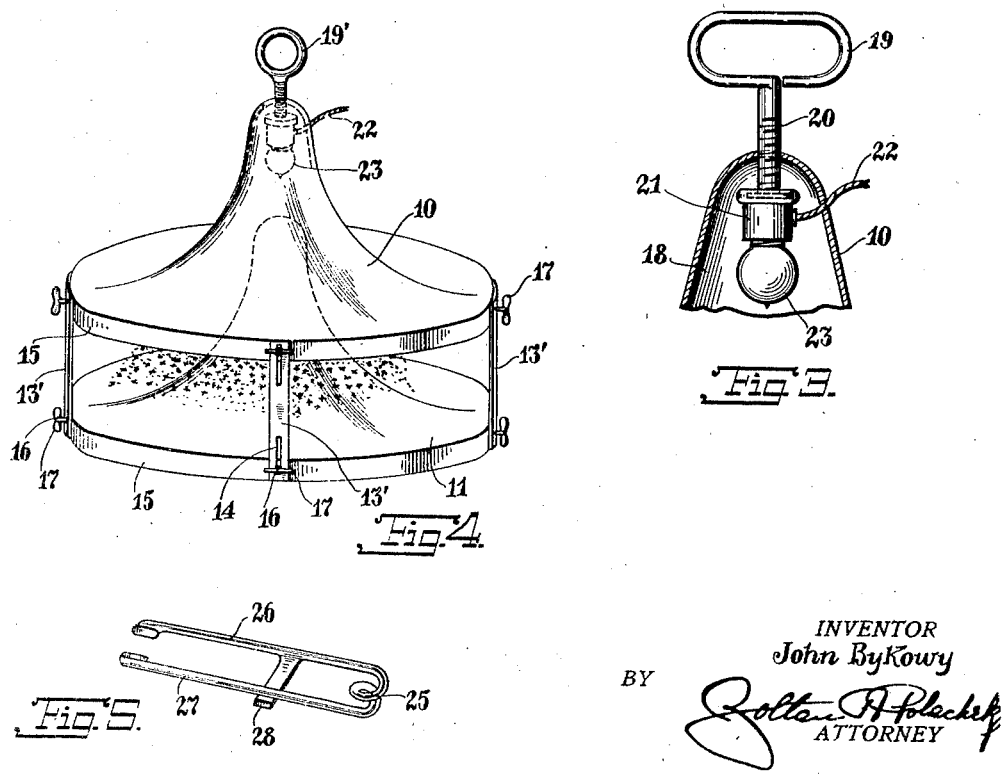
INVENTOR
John Bykowy
BY
Zoltan H Polechek
ATTORNEY Patented Aug. 6, 1929.

1,723,919

UNITED STATES PATENT OFFICE.

JOHN BYKOWY, OF WEST WARWICK, RHODE ISLAND.

INSECT TRAP.

Application filed April 13, 1928. Serial No. 269,657.

This invention relates generally to insect traps, and has more particular reference to a novel type thereof.

The invention has for an object the provision of a device of the class mentioned which is of simple durable construction, desirable and efficient in action, and which can be manufactured and sold at a reasonable cost.

The device proposes the use of a pair of spaced conical shape plates smeared with a sticky substance on their inner sides. A light should be arranged between the apexes of the plates for attracting the insects. The plates should be adjustably mounted relative to each other, and the position of the light should also be adjustable for best adapting the device according to the kinds of insects one expects to attract.

Broadly the device is intended for exterminating corn borers, caterpillars and other insects which damage fruit trees and vegetable gardens. It particularly serves to catch the moths which produce these pests.

For further comprehension of the invention, and of the objects and advantages thereof, reference will be had to the following description and accompanying drawings, and to the appended claims in which the various novel features of the invention are more particularly set forth.

In the accompanying drawing, forming a material part of this disclosure:

Fig. 1 is a perspective view of a device constructed according to this invention.

Fig. 2 is a fragmentary vertical sectional view thereof.

Fig. 3 is a fragmentary detail vertical sectional view of the top portion of the top apex of the device.

Fig. 4 is a perspective view of the device, constructed according to modified form.

Fig. 5 is a perspective view of a pair of pincers used with the device.

The reference numeral 10 indicates generally a top plate member of substantially conical shape and numeral 11 a bottom plate member similarly shaped. A support structure 12 has a plurality of vertical rods 13 formed with elongated slots 14.

Each of the plate members has vertical flanges 15 provided with studs 16 projecting thru the said elongated slots 14, and wing nuts 17 threadedly engage these studs for holding the plate members in spaced relations.

Smeared on the bottom of the top plate member and on the top of the bottom plate member is the sticky substance 18 preferably made of mucilage plus castor oil, or in other words the said sticky substance is on the inner sides of the said spaced plates.

A handle member 19 is provided with a threaded shank 20 threadedly engaging the apex of plate 10 and an electric light socket 21 is rotatively mounted on the bottom of the said shank. An electric cable 22 connects with the socket, and an electric light 23 is engaged in the said socket.

In Fig. 4 a modified form of the device has been illustrated in which short rods 13' are used for spacing the plate members, and the support 12 is eliminated. The handle 19' is of circular form.

Before placing the device into operation, the wing nuts 17 are loosened and the relative position of the plates 10 and 11 to each other is adjusted according to the kind of moths one expects to attract. For small insects the plates should be closely spaced and for large insects they should be distantly spaced. Then the handle 19 or 19' is turned to raise or lower the lamp 23 according to the spacing of the plates.

In operation of the device the lamp 23 is lit. The light will attract the insects and as they fly around in the vicinity of the light they will sooner or later contact with the sticky substance 18 and thus be caught. The device may be suspended from the handle member 19 and 19' if this is convenient.

In Fig. 5 a pair of pincers have been illustrated. These pincers are made of durable wire, bent twice at the center as at 25 and formed with arms 26 and 27. A finger 28 projects from arm 26 and engages the outer side of arm 27 to limit the opening of the arms. These pincers are intended for use in removing the insects caught in the trap.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention what I claim as new and desire to secure by United States Letters Patent is:

1. In an insect trap, vertical flanges formed on a pair of superimposed spaced plates with opposed sticky surfaces, studs projecting from the flanges, vertical bars with elongated apertures engaged on the studs, and wing nuts engaged on the studs for clamping the flanges in desired spaced positions.

2. In an insect trap, vertical flanges formed on a pair of superimposed spaced plates with opposed sticky surfaces, studs projecting from the flanges, vertical bars with elongated apertures engaged on the studs, and wing nuts engaged on the studs for clamping the flanges in desired spaced positions, the said vertical rods extend substantially below the bottom plate for forming support legs for the insect trap.

In testimony whereof I have affixed my signature.

JOHN BYKOWY.